United States Patent Office 3,547,850
Patented Dec. 15, 1970

3,547,850
ASPHALT-POLYMER COMPOSITION
Dean P. Montgomery, Bartlesville, Okla., assignor to Phillips Petroleum Company, a corporation of Delaware
No Drawing. Continuation-in-part of application Ser. No. 483,804, Aug. 30, 1965. This application June 17, 1968, Ser. No. 737,332
Int. Cl. C08f 45/52
U.S. Cl. 260—28.5                                8 Claims

ABSTRACT OF THE DISCLOSURE

Between 0.1 and 10 weight percent of an alkali metal is dispersed in an asphalt at a temperature between the melting point of the alkali metal and 375° F.; subsequently, a monomer, such as a conjugated diene or vinyl-substituted aromatic compound, is polymerized in situ in the absence of a diluent at a temperature between 100 and 300° F. to give an asphalt product having a high softening point and a high penetration ratio.

CROSS REFERENCE TO RELATED APPLICATION

This is a continuation-in-part of application Ser. No. 483,804, filed Aug. 30, 1965, now abandoned.

BACKGROUND OF THE INVENTION

This invention relates to a process for the production of asphalt-polymer compositions having high softening points and high penetration ratios. In another aspect, it relates to a process for increasing the penetration ratio of asphalt and the resulting asphalt.

It is known that the incorporation of rubber or polymers possessing the desirable blending characteristics of rubber into asphalt provides a blend having improved elasticity and having reduced susceptibility to temperature changes when compared to the asphalt. The extent to which these advantages can be realized is dependent upon the degree of dispersion of rubber or polymer obtained in the asphalt. Various methods have been employed in the past to improve the dispersion of rubber or polymer in asphalt, such as the use of finely divided rubber crumb, the use of rubber latices and the use of rubber solutions. These previous methods have been found to be unsatisfactory, particularly when directed to the dispersion of high molecular weight rubbers or polymers in the asphalt. Low molecular weight liquid polymers have been employed in asphaltic blends in an effort to improve dispersion but the produced blends have undesirable properties such as low penetration ratios.

SUMMARY OF THE INVENTION

Accordingly, an object of my invention is to provide a process for producing polymer-asphalt compositions having a high softening point and improved penetration ratio.

Other objects, advantages and features of my invention will be readily apparent to those skilled in the art from the following description and the appended claims.

I have found that if polymer is prepared in situ in asphalt in the absence of a diluent, using an alkali metal catalyst, an asphalt-polymer composition is obtained having a high softening point and high penetration ratio.

DESCRIPTION OF THE PREFERRED EMBODIMENTS

Asphalt, as the term is herein employed, refers to a residual fraction attained upon the distillation of a petroleum crude oil and any of those bituminous materials used heretofore and known in the art such as natural asphalts. The process of this invention is applicable to asphalts having a penetration in the range from about 0 to about 300 or even higher as determined by Test Method ASTM D 5–61, and particularly for asphalts having a penetration in the range from about 40 to 300. The asphalts employed in the process of this invention have softening points (ASTM D 36–56) in the range of 90 to 250° F., preferably 100 to 150° F.

The polymers prepared in situ are those homopolymers and copolymers prepared by the polymerization of monomers selected from the group consisting of conjugated dienes containing from 4 to 12, inclusive, carbon atoms per molecule and vinyl-substituted aromatic compounds wherein the total number of carbon atoms in the combined substituents is generally not greater than 12.

Examples of conjugated dienes which can be employed in the process of this invention include the following: 1,3 - butadiene, isoprene, 2,3 - dimethyl - 1,3 - butadiene, 1,3 - pentadiene, 2 - methyl - 3 - ethyl - 1,3 - butadiene, 3 - methyl - 1,3 - pentadiene, 2 - methyl - 3 - ethyl - 1,3-pentadiene, 2 - ethyl - 1,3 - pentadiene, 1,3 - hexadiene, 1,3 - heptadiene, 3 - methyl - 1,3 - heptadiene, 1,3 - octadiene, 3 - butyl - 1,3 - octadiene, 3,4 - dimethyl - 1,3-hexadiene, 3 - n - propyl - 1,3 - pentadiene, 4,5 - diethyl-1,3 - octadiene, phenyl - 1,3 - butadiene, 2,3 - diethyl-1,3 - butadiene, 2,3 - di - n - propyl - 1,3 - butadiene, and 2 - methyl - 3 - isopropyl - 1,3 - butadiene. Conjugated dienes can be polymerized alone or in admixture with each other to form copolymers in the process of this invention.

Vinyl-substituted aromatic compounds that can be polymerized with the foregoing conjugated dienes include styrene, 1 - vinylnaphthalene, 2 - vinylnaphthalene, and alkyl, cycloalkyl, aryl, alkaryl, aralkyl, alkoxy, aryloxy, and dialkylamino derivatives thereof in which the total number of carbon atoms in the combined substituents is generally not greater than 12. Suitable vinyl-substituted aromatic compounds include 3 - methylstyrene, 3,5 - diethylstyrene, 4 - n - propylstyrene, 2,4,6 - trimethylstyrene, 4 - dodecylstyrene, 3 - methyl - 5 - n - hexylstyrene, 4-cyclohexylstyrene, 4 - phenylstyrene, 2 - ethyl - 4 - benzylstyrene, 4 - p - tolylstyrene, 3,5 - diphenylstyrene, 2,4,6-tri - tert - butylstyrene, and mixtures thereof.

The polymers prepared in situ to produce the compositions of my invention are produced by the polymerization of the aforementioned monomers in the presence of an alkali metal catalyst. The quantity of alkali metal catalyst employed is in the range of 0.1 to 10 weight percent, preferably 0.5 to 5 weight percent of the asphalt. The alkali metal can be dispersed in the asphalt at a temperature ranging from just above the melting point of the metal employed to about 375° F.

Preferably, subsequent to dispersion of the alkali metal in the fluid asphalt, the monomer or comonomers are introduced into the asphalt and polymerization temperatures in the range of 100° F. to 300° F. are maintained in the fluid asphalt. It is within the scope of this invention to introduce the alkali metal into the asphalt subsequent to addition of monomer or monomers to the asphalt. Pressures from atmospheric to 1,000 p.s.i.g. can be employed in the in situ polymerization process step. The asphalt and monomer are mixed by conventional mixing means during the polymerization step.

The ratio of asphalt to polymerized monomer can vary widely depending upon the desired end use. Ratios by weight of from 99:1 to 1:99 of asphalt to monomer are suitable, preferably the resulting composition will contain from 1 to 95, preferably 5 to 50 weight percent polymerized monomer.

I have discovered that the dispersion of the alkali metal in the asphalt and subsequent in situ polymerization process step to produce the polymer in the absence of a diluent produces a composition having a high softening point and a high penetration ratio. Penetration ratio as the term is herein employed refers to the ratio of the penetration at 39.2° F. to the penetration at 77° F. times 100 as determined by ASTM Test Method D 5-61. These compositions produced by the process of my invention having low susceptibility to temperature changes and improved elasticity have wide utility as roofing materials and road surfacing materials.

The dispersion of the alkali metal and subsequent in situ polymerization to produce polymer in the presence of a diluent which is subsequently removed by vaporization produces a blend having a high penetration ratio and improved elasticity but the penetration and softening point of the produced blends are not improved.

It is not known if the unexpected results obtained by polymerizing the monomers in situ in the absence of an extraneous solvent or diluent is the result of forming a blend of unusually fine dispersion, the production of a peculiar type of graft polymer, or even the result of some third type of reaction involving electron transfer between the alkali metal and ring structures in the asphalt.

The following examples are presented to illustrate the objects and advantages of my invention. It is not intended that the invention should be limited to the embodiments illustrated therein.

EXAMPLE I

As asphalt-polybutadiene blend was prepared using an 85/100 penetration asphalt and a polybutadiene having a molecular weight of 2500, said polybutadiene prepared by a sodium-catalyzed 1,3-butadiene polymerization process. This blend contained 4.2 weight percent polybutadiene, based on the asphalt, and was prepared by stirring the polybutadiene into the fluid asphalt at about 250° F. (i.e., a mechanical blend of polymer and asphalt). The test results of the blend (Run 1) are presented below in Table I.

TABLE I

|  | Base asphalt, control | Blend, Run 1 |
|---|---|---|
| Penetration, 77° F., 100 g., 5 seconds | 86 | 118 |
| Penetration, 39.2° F., 100 g., 5 seconds | 21 | 23 |
| Penetration ratio | 24 | 20 |
| Ring and ball softening point, ° F | 115 | 112 |

A comparison of the blend tests with tests of the 85/100 asphalt (control) demonstrate that the softening point is not increased employing the conventional method of blending the polybutadiene with the asphalt and that the penetration ratio of the blend is undesirably lower than the penetration ratio of the 85/100 asphalt (control).

EXAMPLE II

A composition was prepared using the 85/700 penetration asphalt of Example I by saturating the fluid asphalt with 1,3-butadiene while stirring the mixture at about 250° F., thereafter dispersing 1.5 weight percent sodium, based on the asphalt, in the asphalt over a 10 minute period, and continuing stirring for an additional 134 minutes at about 250° F. under an atmosphere of butadiene at atmospheric pressure in the absence of diluent. The reaction period was selected to yield a composition containing 4.2 weight percent polybutadiene, based on the asphalt. The test results of this produced composition (Run 2) are presented below in Table II.

EXAMPLE III

Another composition was prepared in the same manner as the composition in Example II with the exception that 2.1 weight percent sodium, based on the asphalt, was used, and the reaction period following dispersion of the sodium was 110 minutes. A composition containing 4.2 weight percent polybutadiene, based on the asphalt, was obtained. Test results of the produced blend (Run 3) are presented below in Table II.

TABLE II

|  | Run No. 2 | Run No. 33 |
|---|---|---|
| Penetration, 77° F., 100 g., 5 seconds | 40 | 35 |
| Penetration, 39.2° F., 100 g., 5 seconds | 21 | 18 |
| Penetration ratio | 53 | 52 |
| Ring and ball softening point, ° F | 161 | 165 |

Comparison of the results obtained in Runs 2 and 3 with Run 1 of Example I demonstrate the effectiveness of the invention to produce a composition having a significantly higher Ring and Ball softening point and a substantially higher penetration ratio than the blend produced in Run 1 by a conventional method. The penetration ratio for the compositions made by the process of this invention is higher than the normal highway specification of 25, whereas that of the blend prepared by mixing the asphalt and polybutadiene is below the specification value.

EXAMPLE IV

A composition was prepared using the asphalt of Example I by dispersing 1.9 weight percent sodium, based on the asphalt, in the fluid asphalt at about 230° F., and stirring in liquid styrene at 230-240° F. over a ½ hour period in the absence of diluent so as to incorporate 3.9 weight percent polystyrene in the asphalt. Penetration of the resulting asphalt-polymer composition (77° F./100 g./5 seconds) was 24 before heating to 450° F. and 26 after heating to 450° F. This final heating step demonstrates that the styrene (which boils at 293° F.) had polymerized in situ. The Ring and Ball softening point of the product blend before heating to 450° F. was 199° F. and after heating was 179° F. (the control asphalt being 115° F.). This clearly demonstrates the effectiveness of the invention to produce a higher softening point blend by polymerizing styrene in situ. The penetration ratio was approaching 100.

EXAMPLE V

An 85/100 penetration asphalt sample was dissolved in xylene to give a stirrable mixture containing 76 weight percent asphalt. To this mixture was added 1.5 weight percent sodium (based on the asphalt) as a 50/50 (by weight) dispersion of sodium in xylene. The mixture was heated at 210° F. with stirring while sufficient 1,3-butadiene was added to form 6.4 weight percent polymerized polybutadiene in situ. Xylene was stripped from the resulting mixture by heating to 500° F. at 3 mm. mercury pressure. The product had the properties presented below in Table III.

TABLE III

|  | Base asphalt | Run No. 5 |
|---|---|---|
| Penetration, 77° F., 100 g., 5 seconds | 92 | 95 |
| Penetration, 39.2° F., 100 g., 5 seconds | 20 | 32 |
| Penetration ratio | 21.7 | 35 |
| Ring and ball softening point, ° F | 117 | 111 |

A comparison of the test results of the composition produced in the presence of a diluent with the base asphalt employed illustrates that a composition having a substantially higher penetration ratio was produced but the penetration at 77° F. and ring and ball softening point were not improved.

As will be evident to those skilled in the art, various modifications of this invention can be made, or followed, in the light of the foregoing disclosure, without departing from the spirit or scope thereof.

What is claimed is:

1. A process for increasing the penetration ratio of asphalt comprising: admixing in the absence of a diluent (1) between 0.1 and 10 weight percent, based on the weight of said asphalt of an alkali metal and (2) at least one monomer selected from the group consisting of conjugated dienes containing 4-12 carbon atoms per molecule, and vinyl-substituted aromatic compounds, with said asphalt in a reaction zone, the temperature during the admixing of the alkali metal being maintained at a level above the melting point of said alkali metal and below 375° F.; thereafter maintaining said reaction zone under polymerization conditions at a temperature within the range of 100–300° F. and at a pressure between atmospheric and 1000 p.s.i.g. for a time sufficient to effect polymerization of said monomer in situ; and recovering an asphalt product having an increased penetration ratio and increased softening point.

2. A process according to claim 1 wherein said alkali metal is sodium.

3. A process according to claim 1 wherein said asphalt is an 85/100 penetration asphalt, said monomer is 1,3-butadiene, and said alkali metal is sodium.

4. A process according to claim 1 wherein said asphalt is an 85/100 penetration asphalt, said monomer is styrene, and said alkali metal is sodium.

5. A process for increasing the penetration ratio of asphalt comprising: admixing in the absence of a diluent between 0.1 and 10 weight percent based on the weight of said asphalt of an alkali metal with said asphalt at a temperature between the melting point of said alkali metal and 375° F.; thereafter admixing in the absence of a diluent with said asphalt containing said alkali metal at least one monomer selected from the group consisting of conjugated dienes containing 4 to 12 carbon atoms per molecule, and vinyl-substituted aromatic compounds in a reaction zone; maintaining said reaction zone under polymerization conditions at a temperature within the range of 100–300° F. and at a pressure between atmospheric and 1000 p.s.i.g. for a time sufficient to effect polymerization of said monomer in situ; and recovering an asphalt product having an increased penetration ratio.

6. A process according to claim 5 wherein said monomer comprises styrene, said asphalt comprises an 85/100 penetration asphalt, and said alkali metal comprises sodium.

7. A process according to claim 5 wherein said monomer comprises 1,3-butadiene, said asphalt comprises an 85/100 penetration asphalt, and said alkali metal comprises sodium.

8. A product according to the process of claim 1.

References Cited
UNITED STATES PATENTS

| | | | |
|---|---|---|---|
| 2,209,746 | 7/1940 | Ebert | 260—94.2M |
| 3,303,151 | 2/1967 | Peters | 260—28.5AS |
| 3,457,093 | 7/1969 | Montgomery | 208—44X |

MORRIS LIEBMAN, Primary Examiner

T. MORRIS, Assistant Examiner

U.S. Cl. X.R.

106—278; 208—44; 260—94.2